United States Patent
Kern et al.

(10) Patent No.: US 7,571,268 B2
(45) Date of Patent: Aug. 4, 2009

(54) CONSISTENT UPDATES ACROSS STORAGE SUBSYSTEMS COUPLED TO A PLURALITY OF PRIMARY AND SECONDARY UNITS AT SELECTED TIMES

(75) Inventors: Robert Frederic Kern, Otter Rock, OR (US); Gregory Edward McBride, Vail, AZ (US); Kenneth Wayne Boyd, Tucson, AZ (US); William Frank Micka, Tucson, AZ (US); Gail Andrea Spear, Tucson, AZ (US); Robert Francis Bartfai, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 406 days.

(21) Appl. No.: 11/399,973

(22) Filed: Apr. 6, 2006

(65) Prior Publication Data

US 2007/0239950 A1    Oct. 11, 2007

(51) Int. Cl.
    G06F 12/16    (2006.01)
(52) U.S. Cl. .............. 710/74; 710/72; 710/73; 711/161; 711/162; 714/1; 714/13
(58) Field of Classification Search .......... 710/72–74; 714/1, 13; 711/161, 162
    See application file for complete search history.

(56) References Cited

U.S. PATENT DOCUMENTS

| | | | |
|---|---|---|---|
| 5,555,371 A * | 9/1996 | Duyanovich et al. ...... 714/13 |
| 5,734,818 A | 3/1998 | Kern et al. | |
| 6,578,120 B1 * | 6/2003 | Crockett et al. ............ 711/162 |
| 2003/0078903 A1 | 4/2003 | Kimura et al. | |
| 2004/0030837 A1 | 2/2004 | Geiner et al. | |
| 2004/0039959 A1 | 2/2004 | LeCrone et al. | |
| 2004/0078399 A1 | 4/2004 | Tabuchi et al. | |
| 2004/0103164 A1 | 5/2004 | Tabuchi et al. | |
| 2005/0055521 A1 | 3/2005 | Saika | |
| 2005/0071710 A1 | 3/2005 | Micka et al. | |
| 2005/0114407 A1 | 5/2005 | Goyal | |
| 2005/0198452 A1 | 9/2005 | Watanabe | |

FOREIGN PATENT DOCUMENTS

JP    4048464 A    2/1992

OTHER PUBLICATIONS

U.S. Patent Application entitled "Method, System, and Program for Forming a Consistency Group", U.S. Appl. No. 10/676,852, filed Sep. 29, 2003, by inventors G.A. Spear, R.F. Bartfai, E.H-W. Lin, W.F. Micka, O. Gluck, A. Zlotnick, M.E. Factor and T.C. Jarvis.
PCT International Search Report and Written Opinion mailed Jun. 5, 2007 for Application No. PCT/EP2007/052627 filed Mar. 20, 2007.

* cited by examiner

*Primary Examiner*—Tammara Peyton
(74) *Attorney, Agent, or Firm*—Rabindranath Dutta; Konrad Raynes & Victor LLP

(57) ABSTRACT

Provided are a method, system, and article of manufacture, wherein a primary control unit sends a selected time to a plurality of secondary control units. Clocks are periodically synchronized at the primary control unit and the secondary control units with a time server. The primary control unit and the plurality of secondary control units consistently update secondary storage subsystems coupled to the plurality of secondary control units at the selected time.

29 Claims, 4 Drawing Sheets

CONSISTENT UPDATES ACROSS STORAGE SUBSYSTEMS COUPLED TO A PLURALITY OF PRIMARY AND SECONDARY UNITS AT SELECTED TIMES

BACKGROUND

1. Field

The disclosure relates to a method, system, and article of manufacture for consistent updates across storage subsystems.

2. Background

Information technology systems, including storage systems, may need protection from site disasters or outages. Furthermore, information technology systems may require features for data migration, data backup, or data duplication. Implementations for disaster or outage recovery, data migration, data backup, and data duplication may include mirroring or copying of data in storage systems. Enterprise storage servers (ESS) may include one or more processors coupled to storage devices, including high capacity scalable storage devices, Redundant Array of Independent Disks (RAID), etc. Enterprise storage servers may include copy functions for copying data either locally, i.e., within the same on-site ESS, or remotely, i.e., copying data to a separate remote-site ESS.

In certain enterprise storage servers there may be copy functions that provide a point-in-time copy of the data. Implementations may copy data between a set of local/source volumes and a corresponding set of remote/target volumes in storage subsystems in enterprise storage servers. Copy functions may provide a point-in-time copy for ESS volumes by creating a physical point-in-time copy of the data, with minimal interruption to applications, and make it possible to access both the source and target copies substantially immediately.

A consistency group is a group of storage volumes that need to be kept in a consistent state with each other. To provide a non-limiting example, a first copy command copies volume A1 to B1 and a second copy command copies volume A2 to B2. It is required that volumes B1 and B2 should represent a consistent state of the dataset in volumes A1 and A2 at a certain point in time. In a certain sequence of operations on the volumes the following set of dependent write operations may occur (where the second operation occurs after the first operation):
1. Write to dataset on volume A1 (data updated)
2. Write to dataset on volume A2 (data updated)

When volumes A1 and A2 are copied to volumes B1 and B2 respectively, then the following non-limiting example of a sequence of operations may create an inconsistent state in volumes B1, B2 with respect to volumes A1, A2.
1. Copy volume A1 to volume B1
2. Write to dataset on volume A1 (data updated)
3. Write to dataset on volume A2 (data updated)
4. Copy volume A2 to volume B2

At the conclusion of all the copy operations, i.e., the conclusion of the fourth operation, volume B2 contains the data update of volume A2 whereas volume B1 does not contain the data update of volume A1. The set of volumes B1, B2 are in an inconsistent state with respect to the set of volumes A1, A2. An application that uses the volumes B1, B2 could not recover from a back-up copy stored in the volumes B1, B2. stored in a disk coupled to a computer can be backed up by generating an image of the disk.

Certain systems copy a set of source volumes to a set of target volumes in storage subsystems, while maintaining the data on the set of source volumes and target volumes in storage subsystems in a consistent state with respect to each other. Maintaining source and target volumes in storage subsystems in a consistent state ensures that no out of order dependent writes are copied to any target volumes in storage subsystems in a consistency group.

SUMMARY OF THE DESCRIBED EMBODIMENTS

Provided are a method, system, and article of manufacture, wherein a primary control unit sends a selected time to a plurality of secondary control units. Clocks are periodically synchronized at the primary control unit and the secondary control units with a time server. The primary control unit and the plurality of secondary control units consistently update secondary storage subsystems coupled to the plurality of secondary control units at the selected time.

In additional embodiments, the secondary storage subsystems are consistently updated at the selected time in response to a single command from the primary control unit, and wherein the selected time is associated with consistency groups that are used for consistently updating the secondary storage subsystems.

In yet additional embodiments, the primary control unit receives updates from one or more host applications coupled to the primary control unit. The primary control unit stores the updates in at least one primary storage subsystem coupled to the primary control unit. Consistency groups are generated corresponding to the updates, wherein the consistency groups are used for consistently updating the secondary storage subsystems coupled to the plurality of secondary control units.

In further embodiments the plurality of secondary control units receives the selected time from the primary control unit. The plurality of secondary control units initiates a process for consistently updating the secondary storage subsystems coupled to the plurality of secondary control units at the selected time. The plurality of secondary control units receives a request from the primary control unit to complete the initiated process for consistently updating the secondary storage subsystems. The plurality of secondary control units completes the process for consistently updating the secondary storage subsystems, in response to determining that the secondary storage subsystems can be consistently updated. An indication of error is sent to the primary control unit, in response to determining that the secondary storage subsystems cannot be consistently updated.

In yet further embodiments, the primary control unit determines whether each of the plurality of secondary control units has initiated the process for consistently updating the storage subsystems coupled to the plurality of secondary control units at the selected time. The primary control unit requests each of the plurality of secondary control units to complete the process for consistently updating the secondary storage subsystems.

In additional embodiments, write Input/Output (I/O) operations are not busied during consistency group formation while consistently updating the secondary storage subsystems, and wherein source and target volumes are maintained in a consistent state such that no out of order dependent writes are copied to any target volumes in storage subsystems in a consistency group.

BRIEF DESCRIPTION OF THE DRAWINGS

Referring now to the drawings in which like reference numbers represent corresponding parts throughout.

DETAILED DESCRIPTION

Figure 1:
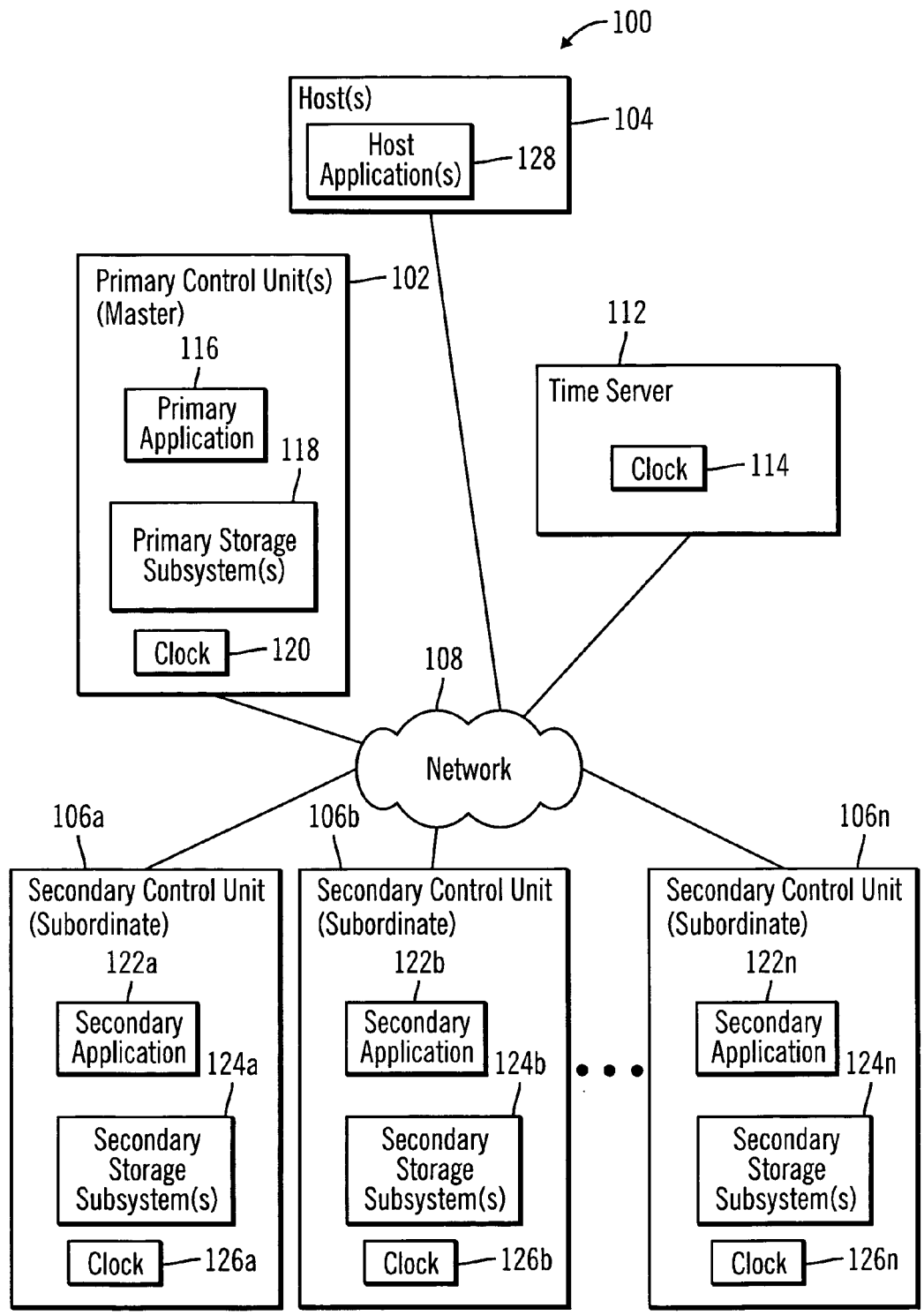
FIG. 1 illustrates a block diagram of a computing environment in accordance with certain embodiments.

In the following description, reference is made to the accompanying drawings which form a part hereof and which illustrate several embodiments. It is understood that other embodiments may be utilized and structural and operational changes may be made.

Data Consistent Methodology for Creating Consistency Groups

IBM's Global Mirror uses a 'data consistent' methodology for generating consistency groups. In 'data consistent' methodology a master control unit issues commands to subordinate control units, and the subordinate control units wait and react to the commands received from the master control unit. To initiate a consistency group, the master control unit sends a command to the subordinate control units to pause input/output (I/O) operations. Only after the last subordinate has completed the pausing of the I/O operations does the master control unit send a command to the subordinate control units to allow the completion of write I/O. It is during this pausing of the I/O that a host application that writes to the master control unit may experience a longer response time. Furthermore, because the pausing of I/O commands does not happen to all subordinate control units at the same time, a single common time stamp is not associated with the consistency group.

The coordination of consistence across volumes in the 'data consistent' methodology may require that write I/O be paused across all volumes in the consistency group and the pausing of the write I/O may impact the execution of applications. Furthermore, an accurate single time stamp that is valid across all volumes in the consistency group is not available. In addition, the master control unit coordinates with all subordinate control during the "pause" window. By pausing all write I/O in order to make sure consistency groups are created, the number of subordinate control units that can participate in the storage system is limited. The greater the number of subordinate control unit, the greater is the application impact time. For example, in a certain non-limiting example, applications may be impacted by 1 millisecond or greater with at little as two subordinate control units participating with a master control unit.

Time Consistent Methodology for Creating Consistency Groups

IBM's Global Mirror and other systems may have used a data consistent model for creating consistency groups because there may not have been any accurate time reference across the control units. Certain embodiments of the invention may use various mechanisms to synchronize all the internal storage control clocks with a server clock to provide enough granularity to provide time consistency for data. For example, certain network time servers using the Network Time Protocol may be used to synchronize time across servers with a granularity of 1 millisecond or less.

Given the availability of a common clock for a plurality of systems that provides the granularity needed for storage based data replication solutions to manage dependent write I/O and build consistency groups, certain embodiments use the common clock and time synchronization to manage dependent write I/O and build consistency groups.

For example, certain embodiments attempt to manage dependent I/O sequencing across all controllers and storage subsystems via a timestamp. But, server and storage subsystem clocks may drift, so certain embodiments ensure that storage subsystems coordinate and synchronize their times with a common clock source at a granularity smaller than the time it take to perform a dependent I/O sequence. A non-limiting example of a dependent I/O sequence is a data base table update that takes place via three dependent I/O operations as follows:

I/O operation #1: Update data base log volume indicating that a data base table update is to take place.

I/O operation #2: Update the data base table.

I/O operation #3: Update the data base table indicating that I/O operation #2 was completed.

The data base log and the data base table may physically reside on the same or different volumes, attached to the same or different storage subsystems. Consistency groups are formed based on a time, such that, across the primary and secondary storage subsystems if a user attempts to determine at the secondary storage subsystems if I/O operation #1 and I/O operation #3 are both complete on the secondary volume, then I/O operation #2 must also be complete on the secondary volume. If the storage subsystems are not synchronized to a common clock with a granularity less than the time of an I/O operation, then potentially this I/O sequence could be completed out of order on the secondary target volumes in storage subsystems since, the asynchronous data replication technique being used is asynchronous to the data base application issuing the I/Os across the primary storage subsystems. For example, if the results of I/O operation #1 and I/O operation number #3 were to reside on the target volumes without the results of I/O operation #2, undetectable data integrity issues would arise as the data base log would indicate that the data in the data base table was correct, whereas the data base table would have down level data.

Time based consistency across various servers enables certain embodiments of the invention to use the common timestamp to build and manage consistency groups. This allows the avoidance of data freeze techniques employed by asynchronous data replication mechanisms, such as the IBM Global Mirror. The data freeze techniques require all write I/O to be dynamically held off, i.e., busied during the time of the consistency group formation time in order to ensure I/O consistency across storage volumes and storage subsystems.

FIG. 1 illustrates a block diagram of a computing environment 100 in accordance with certain embodiments. One or more primary control units 102 are coupled to one or more hosts 104 and one more secondary control units 106a, 106b, . . . , 106n. The coupling of the primary control units 102 to the secondary control units 106a . . . 106n may be over a network 108, and the coupling of the primary control units 102 and the secondary control units 106a . . . 106n to the hosts 104 may also be over the network 108. The coupling of various components of the computing environment 100 may also be over a direct connection instead of or in addition to a network connection. While a single network 108 is shown in FIG. 1, additional networks may also provide connectively between various components of the computing environment 100. The primary control units 102 in association with the secondary control units 106a . . . 106n may allow the replication of data, where all data is stored consistently in the primary control units 102 and the secondary control units 106a . . . 106n. A time server 112 is coupled to the network 108, and the time server 112 may be used to synchronize the time of the primary control units 102 and the secondary control units 106a . . . 106n. The time server 112 includes a clock 114 that generates the time provided by the time server 112. In certain embodiments, the time server 112 may be a network time server.

The primary control units 102, the secondary control units 106a . . . 106n, and the hosts 102 may each include a computational platform that may comprise any suitable computational platform, including those presently known in the art, such as, personal computers, workstations, mainframes, midrange computers, network appliances, palm top computers, telephony devices, blade computers, hand held computers, etc. A primary control unit, such as the primary control unit 102, may be referred to as a master, and a secondary control unit, such as the secondary control unit 106a may be referred to as a subordinate.

The primary control unit 102 includes a primary application 116, one or more storage subsystems that are referred to as primary storage subsystems 118, and a clock 120. The primary storage subsystems 118 may include storage volumes that store data. The clock 120 represents the time at the primary control unit 102. Data stored in the primary storage subsystems 116 may be time stamped according to the time provided by the clock 120. The primary application 116 on the primary control unit 102 may periodically synchronize the clock 120 of the primary control unit 102 with the clock 114 of the time server 112, such that the clock 120 of the primary control unit 102 is set to the time indicated by the clock 114 of the time server 112 after synchronization.

The plurality of secondary control units 106a, 106b, . . . , 106n, include secondary applications 122a, 122b, . . . , 122n, secondary storage subsystems 124a, 124b, . . . , 124n and clocks 126a, 126b, . . . , 126n. For example, the secondary control unit 106a includes the secondary application 122a, the secondary storage subsystem 124a, and the clock 126a. A secondary application, such as the secondary application 122a, periodically synchronizes a clock of a secondary control unit, such as the clock 126a of the secondary control unit 106a, with the clock 114 of the time server 112. The secondary storage subsystems 124a . . . 124n may include storage volumes that store data.

The hosts 104 may include one or more host applications 128 that may send commands to the primary control units 102 and the secondary control units 106a . . . 106n to perform various operations, such as Input/Output (I/O) operations.

Therefore, FIG. 1 illustrates certain embodiments in which the clocks 120, 126a . . . 126n of primary control units 102 and secondary control units 106a . . . 106n are kept synchronized with the clock 114 of a time server 112, where the time server 112 may be a network time server. In certain embodiments, the synchronization of the clocks 120, 126a . . . 126n with the clock 114 may be performed by using the network time protocol.

Figure 2:
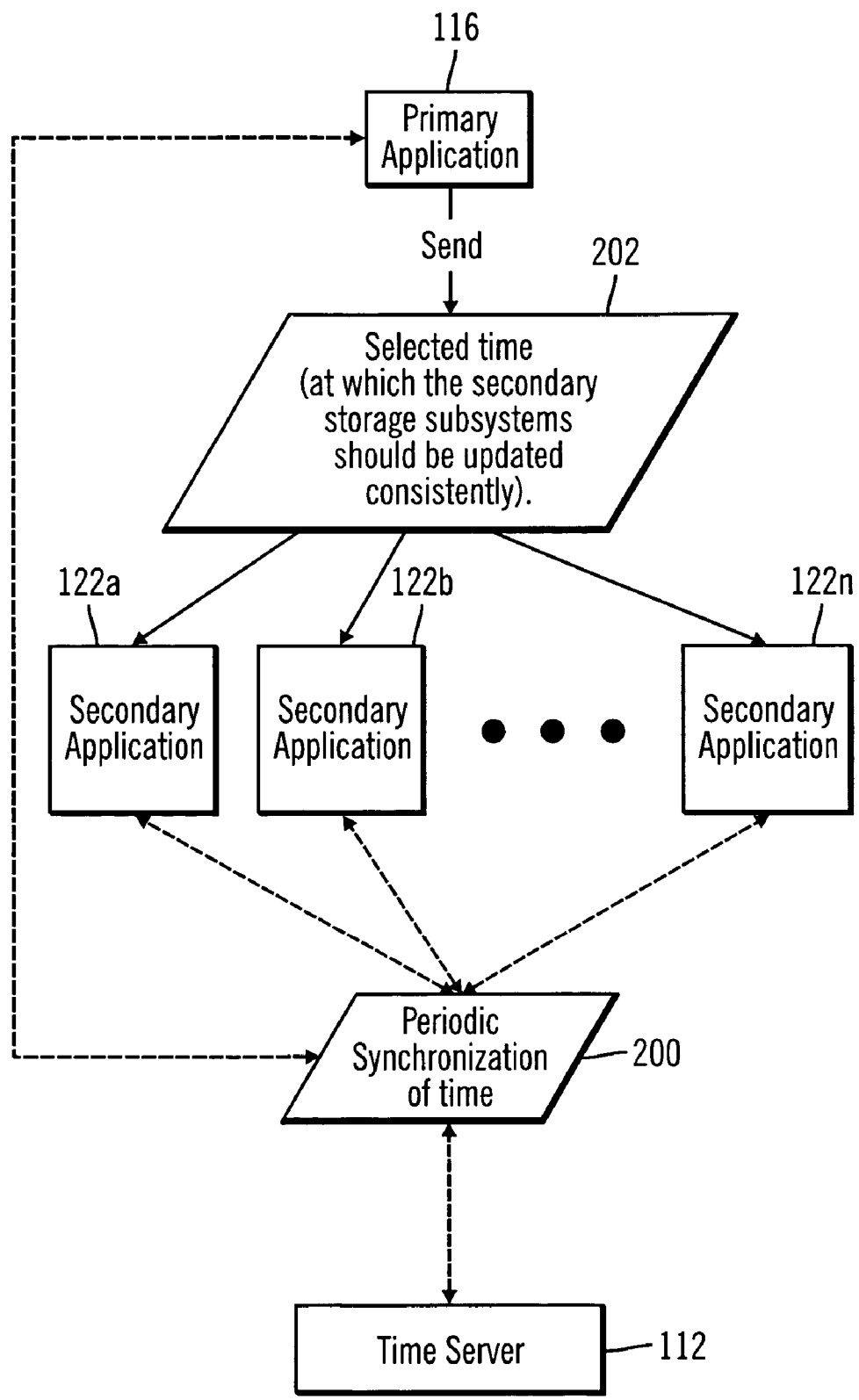
FIG. 2 illustrates operations for performing periodic synchronization of time and operations for the sending of a selected time at which storage subsystems should be updated consistently, in accordance with certain embodiments.

FIG. 2 illustrates operations implemented in the computing environment 100 for performing periodic synchronization of time and the sending of a selected time at which storage subsystems should be updated consistently, in accordance with certain embodiments.

A periodic synchronization of time 200 is performed by the primary application 116 on the primary control unit 102, and the secondary applications 122a, 122b, . . . , 122n on the secondary control units 106a, 106b, . . . , 106n, with the time server 112. The periodic synchronization of time 200 may be performed by using a network time protocol. In certain embodiments, Global Positioning System (GPS) may be used as a source of accurate time, and the GPS may be used as a reference clock.

In certain embodiments, the primary application 116 on the primary control unit 102 sends a selected time 202 to each of the secondary application 122a . . . 122n on the secondary control units 106a . . . 106n, such that the secondary storage subsystems 124a . . . 124n are updated consistently when the corresponding clocks 126a . . . 126n on the secondary control units 106a . . . 106n indicate the selected time. For example, the primary application 116 may at 3 PM send the selected time of 3:01 PM to each of the secondary applications 122a . . . 122n. The secondary applications 122a . . . 122n monitor the time of 3:01 PM and on reaching the time of 3:01 PM initiate the processes of consistently updating the secondary storage subsystems 124a . . . 124n at 3:01 PM. After the primary application 116 determines that all secondary application 122a . . . 122n have initiated the processes of consistently updating the secondary storage subsystems 124a . . . 124n, then the secondary storage subsystems 124a . . . 124n are consistently updated by the secondary applications 122a . . . 122n.

Therefore, FIG. 2 illustrates certain embodiments in which a primary control unit 102 and secondary control units 106a . . . 106n periodically synchronize the clocks 120, 126a . . . 126n at the primary control unit 102 and the secondary control units 106a . . . 106n with a time server 112. The primary control unit 102 sends a selected time 202 to a plurality of secondary control units 106a . . . 106n, where the selected time 202 is in the future. A consistent update is made of the data stored in the secondary storage subsystems 124a . . . 124n by the secondary control units 106a . . . 106n at the selected time.

Figure 3:
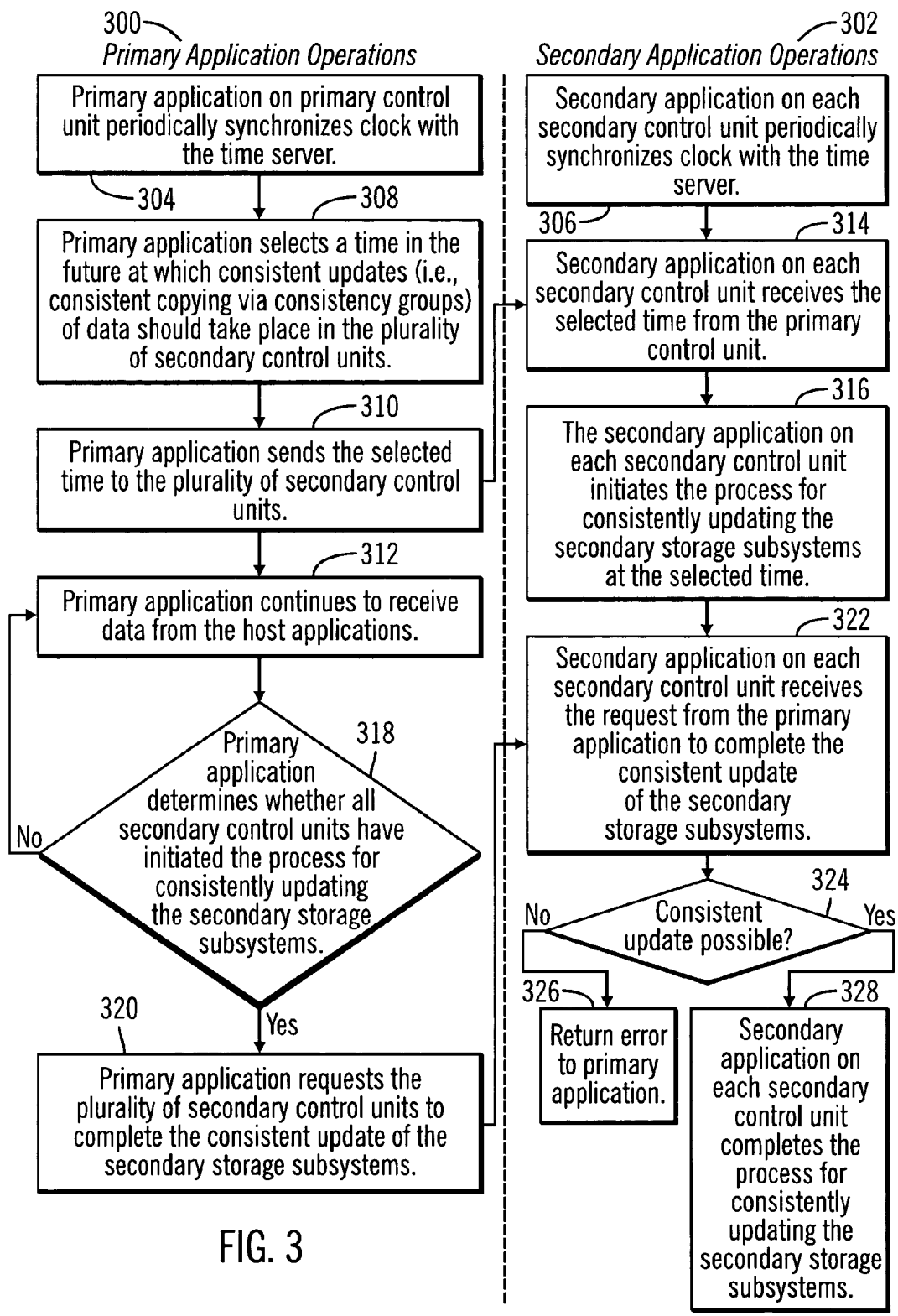
FIG. 3 illustrates operations performed at a primary control unit and a plurality of secondary control units, in accordance with certain embodiments.

FIG. 3 illustrates operations performed at a primary control unit 102 and a plurality of secondary control units 106a . . . 106n, in accordance with certain embodiments. The operations may be implemented in the primary application 116 included in the primary control unit 102, and in the secondary applications 122a . . . 122n included in the secondary control units 106a . . . 106n. The operations performed by the primary control unit 102 are referred to as primary application operations 300 and the operations performed by any of the secondary control units 106a . . . 106n are referred to as secondary application operations 302.

Control starts at blocks 304 and 306, wherein at block 304 the primary application 116 on the primary control unit 102 periodically synchronizes the clock 120 on the primary control unit 102 with the clock 114 of the time server 112, and wherein at block 306 the secondary application on each of the secondary control units periodically synchronizes the corresponding clock with the time server 112. For example, the secondary application 122a may synchronize the clock 126a of the secondary control unit 106a with the clock 114 of the time server 112.

From block 304, control proceeds to block 308 where the primary application 116 selects a time in the future at which consistent updates (i.e., consistent copying via consistency groups) of data should take place in the plurality of secondary control units 106a . . . 106n. The primary application 116 sends (at block 310) the selected time 202 to the plurality of secondary control units 106a . . . 106n. After sending the selected time 202 to the secondary control units 106a . . . 106n, the primary application 116 continues (at block 312) to receive data from the host applications 128.

The secondary applications 122a . . . 122n on each of the secondary control units 106a . . . 106n receive (at block 314) the selected time 202 from the primary control unit 102, where the selected time 202 had been sent at block 310 by the primary application 116 on the primary control unit 102.

The secondary applications 122a . . . 122n on each of the secondary control units 106a . . . 106n initiate a process for consistently updating the secondary storage subsystems 124a . . . 124n at the selected time 202. However, unless the secondary applications 122a . . . 122n receive a confirmation from the primary application that all secondary applications 122a . . . 122n have initiated the process for consistently updating the secondary storage subsystems 124a . . . 124n the consistent update of the volumes of the secondary storage subsystems 124a . . . 124n are not performed.

From block 312 control proceeds to block 318, where the primary application 116 determines whether all secondary control units 106a . . . 106n have initiated the process for consistently updating the secondary storage subsystems 124a . . . 124n. If so, then the primary application 116 requests (at block 320) the plurality of secondary control units 106a . . . 106n to complete the consistent update of the secondary storage subsystems 124a . . . 124n. If not, then control returns to block 312 where the primary application 116 continues to receive data from the host applications 128.

The secondary applications 122a . . . 122n on each of the secondary control units 106a . . . 106n receive (at block 322) the request from the primary application 116 to complete the consistent update of the secondary storage subsystems 124a . . . 124n. The secondary applications 122a . . . 122n on each of the secondary control units 106a . . . 106n determine (at block 324) whether the consistent update is possible. If the consistent update is not possible, an error is returned (at block 326) to the primary application 116. If it is determined (at block 324) that the consistent update is possible, then control proceeds to block 328, where the secondary applications 122a . . . 122n on each of the secondary control units 106a . . . 106n complete the process for consistently updating the secondary storage subsystems 124a . . . 124n. The completion of the process for consistently updating the secondary storage subsystems 124a . . . 124n may be performed by copying source storage volumes to target storage volumes that are stored in the secondary storage subsystems.

In certain embodiments of the invention, write Input/Output (I/O) operations are not busied during consistency group formation while consistently updating the secondary storage subsystems, and the source and target volumes are maintained in a consistent state such that no out of order dependent writes are copied to any target volumes in storage subsystems in a consistency group.

Certain embodiments use a time consistent methodology for updating consistency groups rather than use a purely data consistent methodology for updating consistency groups. I/O operations do not have to be paused across all volumes in the consistency group. Since I/O operations do not have to be paused, the number of storage subsystems that can participate in certain embodiments is not limited to the maximum number of secondary control units that can be paused by a primary control unit to prevent unacceptable impact on application response times. A single time is associated with each consistency group in certain embodiments of the invention.

Certain embodiments for managing consistent updates for data replication purposes are also applicable to indirect data replication solutions like Continuous Data Protection (CDP) journals that also maintain the dependent order of write I/O's when recreating a "copy of the data" at any point in time. The common clock schema would work across a collection of CDP appliances if the CDP appliances were introduced to capture and manage the updates across the target secondary storage subsystems.

ADDITIONAL EMBODIMENT DETAILS

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 4:
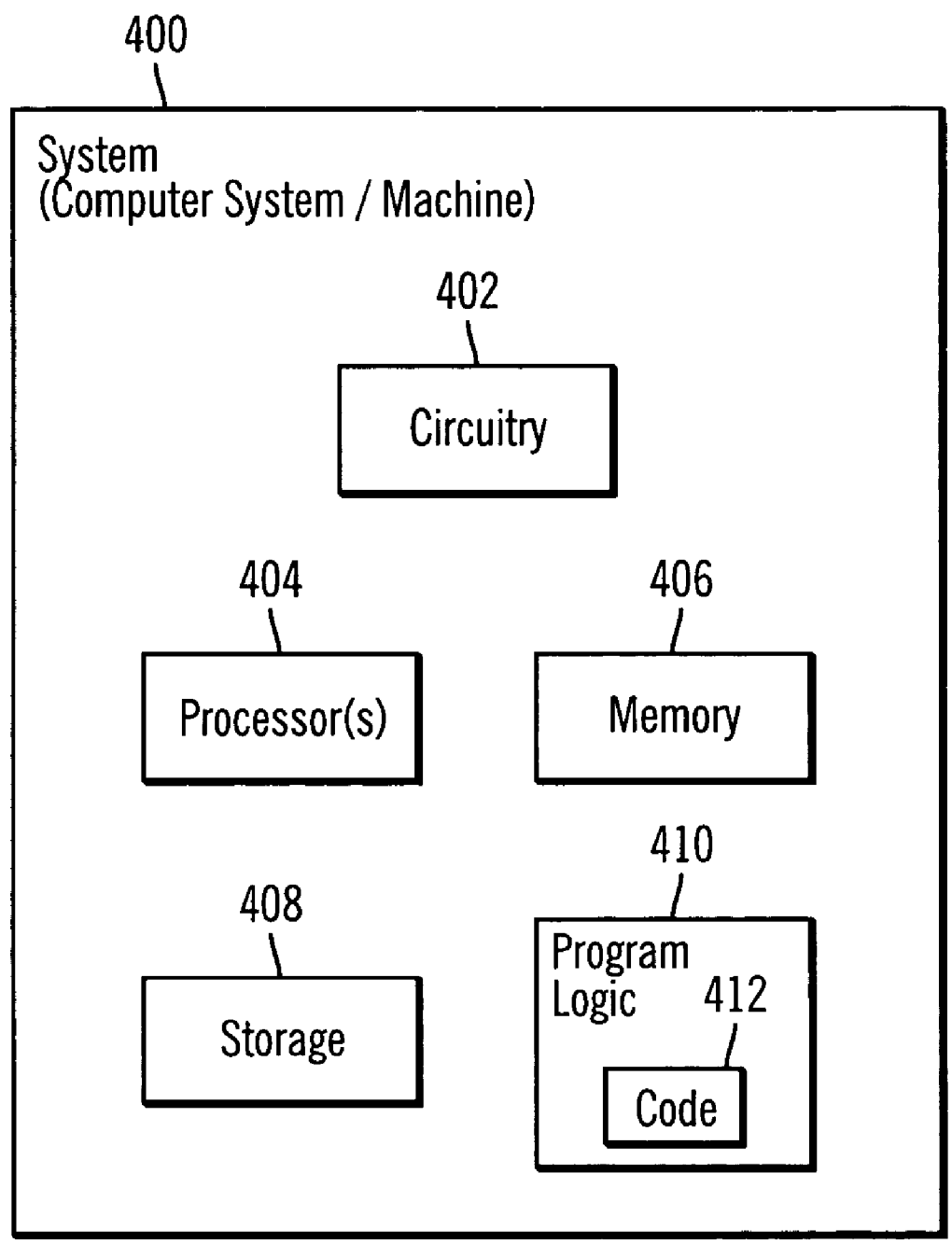
FIG. 4 illustrates the architecture of computing system, wherein in certain embodiments the computational platform of the computing environment of FIG. 1 may be implemented in accordance with the architecture of the computing system.

FIG. 4 illustrates an exemplary computer system 400, wherein in certain embodiments the computational platforms 102, 104, 106a . . . 106n, 112 of the computing environment 100 of FIG. 1 may be implemented in accordance with the computer architecture of the computer system 400. The computer system 400 may also be referred to as a system, and may include a circuitry 402 that may in certain embodiments include a processor 404. The system 400 may also include a memory 406 (e.g., a volatile memory device), and storage 408. Certain elements of the system 400 may or may not be found in the computational platforms 102, 104, 106a . . . 106n, 112 of FIG. 1. The storage 408 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 408 may comprise an internal storage device, an attached storage device and/or a network accessible storage device. The system 400 may include a program logic 410 including code 412 that may be loaded into the memory 406 and executed by the processor 404 or circuitry 402. In certain embodiments, the program logic 410 including code 412 may be stored in the storage 408. In certain other embodiments, the program logic 410 may be implemented in the circuitry 402. Therefore, while FIG. 4 shows the program logic 410 separately from the other elements, the program logic 410 may be implemented in the memory 406 and/or the circuitry 402.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 2 and 3 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-4 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   sending, by a primary control unit, a selected time to a plurality of secondary control units;
   periodically synchronizing clocks at the primary control unit and the secondary control units with a time server; and
   consistently updating, by the primary control unit and the plurality of secondary control units, secondary storage subsystems coupled to the plurality of secondary control units at the selected time, wherein the method further comprises:
   (i) determining, by the primary control unit, whether each of the plurality of secondary control units has initiated a process for consistently updating the secondary storage subsystems coupled to the plurality of secondary control units at the selected time; and
   (ii) requesting, by the primary control unit, each of the plurality of secondary control units to complete the process for consistently updating the secondary storage subsystems, in response to determining by the primary control unit that each of the plurality of secondary control units has initiated the process for consistently updating the secondary storage subsystems coupled to the plurality of secondary control units at the selected time.

2. The method of claim 1, wherein the secondary storage subsystems are consistently updated at the selected time in response to a single command from the primary control unit, and wherein the selected time is associated with consistency groups that are used for consistently updating the secondary storage subsystems.

3. The method of claim 1, further comprising:
receiving, at the primary control unit, updates from one or more host applications coupled to the primary control unit;
storing the updates in at least one primary storage subsystem coupled to the primary control unit; and
generating consistency groups corresponding to the updates, wherein the consistency groups are used for consistently updating the secondary storage subsystems coupled to the plurality of secondary control units.

4. The method of claim 1, further comprising:
receiving, by the plurality of secondary control units, the selected time from the primary control unit;
initiating, by the plurality of secondary control units, the process for consistently updating the secondary storage subsystems coupled to the plurality of secondary control units at the selected time;
receiving, at the plurality of secondary control units, a request from the primary control unit to complete the initiated process for consistently updating the secondary storage subsystems;
completing, by the plurality of secondary control units, the process for consistently updating the secondary storage subsystems, in response to determining that the secondary storage subsystems can be consistently updated; and
sending an indication of error to the primary control unit, in response to determining that the secondary storage subsystems cannot be consistently updated.

5. The method of claim 1, wherein write Input/Output (I/O) operations are not busied during consistency group formation while consistently updating the secondary storage subsystems, and wherein source and target volumes in storage subsystems are maintained in a consistent state such that no out of order dependent writes are copied to any target volumes in storage subsystems in a consistency group.

6. A method for deploying computing infrastructure, comprising integrating computer-readable code into a computing system, wherein the code in combination with the computing system is capable of performing:
sending, by a primary control unit, a selected time to a plurality of secondary control units;
periodically synchronizing clocks at the primary control unit and the secondary control units with a time server; and
consistently updating, by the primary control unit and the plurality of secondary control units, secondary storage subsystems coupled to the plurality of secondary control units at the selected time, wherein the code in combination with the computing system is further capable of performing:
(i) determining, by the primary control unit, whether each of the plurality of secondary control units has initiated a process for consistently updating the secondary storage subsystems coupled to the plurality of secondary control units at the selected time; and
(ii) requesting, by the primary control unit, each of the plurality of secondary control units to complete the process for consistently updating the secondary storage subsystems, in response to determining by the primary control unit that each of the plurality of secondary control units has initiated the process for consistently updating the secondary storage subsystems coupled to the plurality of secondary control units at the selected time.

7. The method for deploying computing infrastructure of claim 6, wherein the secondary storage subsystems are consistently updated at the selected time in response to a single command from the primary control unit, and wherein the selected time is associated with consistency groups that are used for consistently updating the secondary storage subsystems.

8. The method for deploying computing infrastructure of claim 6, wherein the code in combination with the computing system is further capable of performing:
receiving, at the primary control unit, updates from one or more host applications coupled to the primary control unit;
storing the updates in at least one primary storage subsystem coupled to the primary control unit; and
generating consistency groups corresponding to the updates, wherein the consistency groups are used for consistently updating the secondary storage subsystems coupled to the plurality of secondary control units.

9. The method for deploying computing infrastructure of claim 6, wherein the code in combination with the computing system is further capable of performing:
receiving, by the plurality of secondary control units, the selected time from the primary control unit;
initiating, by the plurality of secondary control units, the process for consistently updating the secondary storage subsystems coupled to the plurality of secondary control units at the selected time;
receiving, at the plurality of secondary control units, a request from the primary control unit to complete the initiated process for consistently updating the secondary storage subsystems;
completing, by the plurality of secondary control units, the process for consistently updating the secondary storage subsystems, in response to determining that the secondary storage subsystems can be consistently updated; and
sending an indication of error to the primary control unit, in response to determining that the secondary storage subsystems cannot be consistently updated.

10. The method for deploying computing infrastructure of claim 6, wherein write Input/Output (I/O) operations are not busied during consistency group formation while consistently updating the secondary storage subsystems, and wherein source and target volumes in storage subsystems are maintained in a consistent state such that no out of order dependent writes are copied to any target volumes in storage subsystems in a consistency group.

11. The method of claim 1, wherein a Global Positioning System is used as a reference clock to periodically synchronize the clocks.

12. The method of claim 1, wherein a network time protocol is used to periodically synchronize the clocks.

13. The method for deploying computing infrastructure of claim 6, wherein a Global Positioning System is used as a reference clock to periodically synchronize the clocks.

14. The method for deploying computing infrastructure of claim 6, wherein a network time protocol is used to periodically synchronize the clocks.

15. A system in communication with a time server, comprising:
a primary control unit coupled to the time server;
a plurality of secondary control units coupled to the time server;
secondary storage subsystems coupled to the plurality of secondary control units; memory; and
processor coupled to the memory, wherein the processor executes:
sending, by the primary control unit, a selected time to the plurality of secondary control units;

periodically synchronizing clocks at the primary control unit and the secondary control units with a time server; and consistently updating, by the primary control unit and the plurality of secondary control units, the secondary storage subsystems coupled to the plurality of secondary control units at the selected time, wherein the processor further executes:

(i) determining, by the primary control unit, whether each of the plurality of secondary control units has initiated a process for consistently updating the secondary storage subsystems coupled to the plurality of secondary control units at the selected time; and (ii) requesting, by the primary control unit, each of the plurality of secondary control units to complete the process for consistently updating the secondary storage subsystems, in response to determining by the primary control unit that each of the plurality of secondary control units has initiated the process for consistently updating the secondary storage subsystems coupled to the plurality of secondary control units at the selected time.

16. The system of claim 15, wherein the secondary storage subsystems are consistently updated at the selected time in response to a single command from the primary control unit, and wherein the selected time is associated with consistency groups that are used for consistently updating the secondary storage subsystems.

17. The system of claim 15, wherein the processor further executes:

receiving, at the primary control unit, updates from one or more host applications coupled to the primary control unit;

storing the updates in at least one primary storage subsystem coupled to the primary control unit; and generating consistency groups corresponding to the updates, wherein the consistency groups are used for consistently updating the secondary storage subsystems coupled to the plurality of secondary control units.

18. The system of claim 15, wherein the processor further executes:

receiving, by the plurality of secondary control units, the selected time from the primary control unit;

initiating, by the plurality of secondary control units, the process for consistently updating the secondary storage subsystems coupled to the plurality of secondary control units at the selected time;

receiving, at the plurality of secondary control units, a request from the primary control unit to complete the initiated process for consistently updating the secondary storage subsystems: completing, by the plurality of secondary control units, the process for consistently updating the secondary storage subsystems, in response to determining that the secondary storage subsystems can be consistently updated; and sending an indication of error to the primary control unit, in response to determining that the secondary storage subsystems cannot be consistently updated.

19. The system of claim 15, wherein write Input/Output (I/O) operations are not busied during consistency group formation while consistently updating the secondary storage subsystems, and wherein source and target volumes in storage subsystems are maintained in a consistent state such that no out of order dependent writes are copied to any target volumes in storage subsystems in a consistency group.

20. A computer readable storage medium for controlling a primary control unit and a plurality of secondary control units, wherein the primary control unit and the plurality of secondary control units are in communication with a time server, wherein secondary storage subsystems are coupled to the secondary control units, and wherein code stored in the computer readable storage medium when executed by a processor is capable of causing operations, the operations comprising:

sending, by the primary control unit, a selected time to the plurality of secondary control units;

periodically synchronizing clocks at the primary control unit and the secondary control units with a time server; and consistently updating, by the primary control unit and the plurality of secondary control units, the secondary storage subsystems coupled to the plurality of secondary control units at the selected time, wherein the operations further comprise:

(i) determining, by the primary control unit, whether each of the plurality of secondary control units has initiated a process for consistently updating the secondary storage subsystems coupled to the plurality of secondary control units at the selected time; and (ii) requesting, by the primary control unit, each of the plurality of secondary control units to complete the process for consistently updating the secondary storage subsystems, in response to determining by the primary control unit that each of the plurality of secondary control units has initiated the process for consistently updating the secondary storage subsystems coupled to the plurality of secondary control units at the selected time.

21. The computer readable storage medium of claim 20, wherein the secondary storage subsystems are consistently updated at the selected time in response to a single command from the primary control unit, and wherein the selected time is associated with consistency groups that are used for consistently updating the secondary storage subsystems.

22. The computer readable storage medium of claim 20, the operations further comprising:

receiving, at the primary control unit, updates from one or more host applications coupled to the primary control unit;

storing the updates in at least one primary storage subsystem coupled to the primary control unit; and generating consistency groups corresponding to the updates, wherein the consistency groups are used for consistently updating the secondary storage subsystems coupled to the plurality of secondary control units.

23. The computer readable storage medium of claim 20, the operations further comprising:

receiving, by the plurality of secondary control units, the selected time from the primary control unit;

initiating, by the plurality of secondary control units, the process for consistently updating the secondary storage subsystems coupled to the plurality of secondary control units at the selected time;

receiving, at the plurality of secondary control units, a request from the primary control unit to complete the initiated process for consistently updating the secondary storage subsystems; completing, by the plurality of secondary control units, the process for consistently updating the secondary storage subsystems, in response to determining that the secondary storage subsystems can be consistently updated; and sending an indication of error to the primary control unit, in response to determining that the secondary storage subsystems cannot be consistently updated.

24. The computer readable storage medium of claim 20, wherein write Input/Output (I/O) operations are not busied during consistency group formation while consistently updating the secondary storage subsystems, and wherein source and target volumes in storage subsystems are maintained in a consistent state such that no out of order dependent writes are copied to any target volumes in storage subsystems in a consistency group.

25. A system in communication with a time server, comprising:

a primary control unit coupled to the time server;

a plurality of secondary control units coupled to the time server;

secondary storage subsystems coupled to the plurality of secondary control units;

means for sending, by the primary control unit, a selected time to the plurality of secondary control units;

means for periodically synchronizing clocks at the primary control unit and the secondary control units with a time server; and means for consistently updating, by the primary control unit and the plurality of secondary control units, the secondary storage subsystems coupled to the plurality of secondary control units at the selected time;

means for determining, by the primary control unit, whether each of the plurality of secondary control units has initiated a process for consistently updating the secondary storage subsystems coupled to the plurality of secondary control units at the selected time;

means for requesting, by the primary control unit, each of the plurality of secondary control units to complete the process for consistently updating the secondary storage subsystems, in response to determining by the primary control unit that each of the plurality of secondary control units has initiated the process for consistently updating the secondary storage subsystems coupled to the plurality of secondary control units at the selected time.

26. The system of claim 25, wherein the secondary storage subsystems are consistently updated at the selected time in response to a single command from the primary control unit, and wherein the selected time is associated with consistency groups that are used for consistently updating the secondary storage subsystems.

27. The system of claim 25, the system further comprising:

means for receiving, at the primary control unit, updates from one or more host applications coupled to the primary control unit;

means for storing the updates in at least one primary storage subsystem coupled to the primary control unit; and means for generating consistency groups corresponding to the updates, wherein the consistency groups are used for consistently updating the secondary storage subsystems coupled to the plurality of secondary control units.

28. The system of claim 25, the system further comprising:

means for receiving, by the plurality of secondary control units, the selected time from the primary control unit;

means for initiating, by the plurality of secondary control units, the process for consistently updating the secondary storage subsystems coupled to the plurality of secondary control units at the selected time;

means for receiving, at the plurality of secondary control units, a request from the primary control unit to complete the initiated process for consistently updating the secondary storage subsystems;

means for completing, by the plurality of secondary control units, the process for consistently updating the secondary storage subsystems, in response to determining that the secondary storage subsystems can be consistently updated; and means for sending an indication of error to the primary control unit, in response to determining that the secondary storage subsystems cannot be consistently updated.

29. The system of claim 25, wherein write Input/Output (I/O) operations are not busied during consistency group formation while consistently updating the secondary storage subsystems, and wherein source and target volumes in storage subsystems are maintained in a consistent state such that no out of order dependent writes are copied to any target volumes in storage subsystems in a consistency group.

* * * * *